July 25, 1939.    G. KEINATH    2,166,932
METHOD AND SYSTEM FOR TESTING HIGH VOLTAGE INSULATION
Filed March 16, 1936
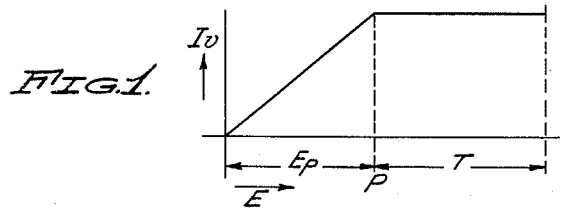
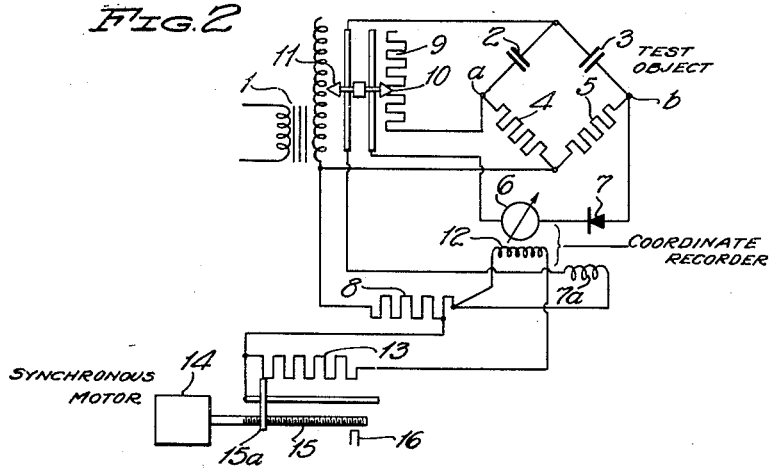
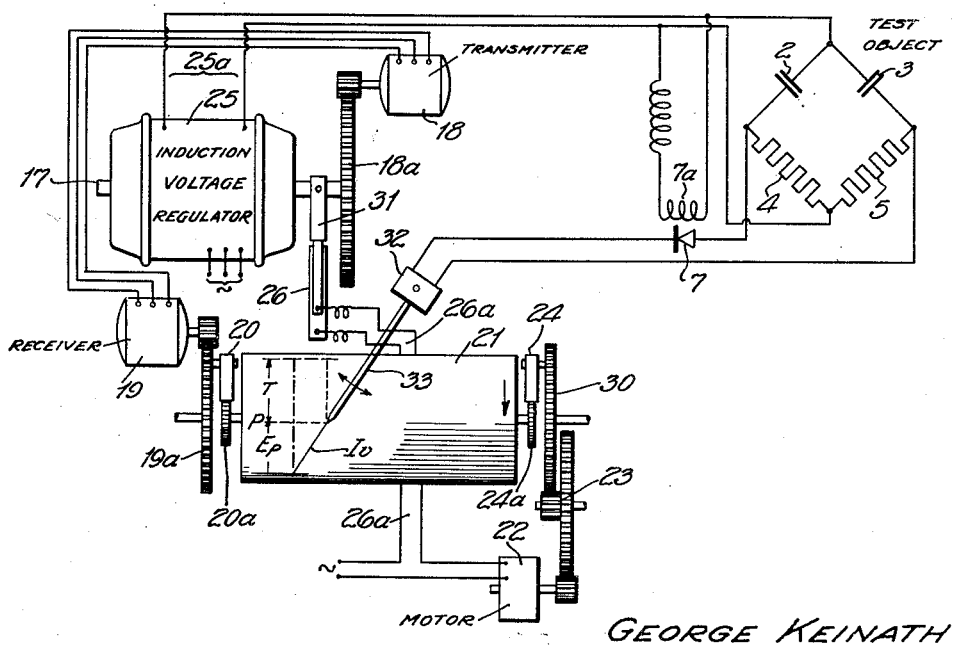
GEORGE KEINATH
INVENTOR Patented July 25, 1939

2,166,932

UNITED STATES PATENT OFFICE 2,166,932

METHOD AND SYSTEM FOR TESTING HIGH VOLTAGE INSULATION

Georg Keinath, Berlin-Charlottenburg, Germany, assignor to Siemens & Halske, Aktiengesellschaft, Siemensstadt, near Berlin, Germany, a corporation of Germany Application March 16, 1936, Serial No. 69,104 In Germany March 15, 1935

7 Claims. (Cl. 234—5.5)

(Granted under the provisions of sec. 14, act of March 2, 1927; 357 O. G. 5)

My invention relates to a method and a system for testing high-voltage insulation.

For measuring dielectric losses in high-voltage apparatus an alternating-current measuring bridge is preferably employed. The relatively complicated manipulation of the measuring bridge may be simplified if the elements of the bridge are so dimensioned that the ohmic bridge resistances are small as compared to the capacitive bridge resistances and to the resistance in the measuring diagonal. When dimensioning the bridge elements in the above manner the loss factor may be read off or recorded directly as deflection of the instrument lying in the measuring diagonal.

The loss factor indicates in a more reliable manner than the hitherto prescribed test with overvoltage during a predetermined testing time whether an insulation fulfils the desired technical requirements. While the usual test may not necessarily lead to a rupture of the insulation it may nevertheless, injure the insulation—which would have probably been sufficiently permanently sound for normal working conditions without such additional stresses—to such an extent as to cause later on a rupture of the insulation with continuous application of the operating voltage. In contradistinction thereto it may be concluded from the loss factor whether the insulation is unduly loaded at the voltage under consideration. In this case it is, however, to be considered that the absolute value of the loss factor is not a measure for the reliability of the insulation, but that the course of the loss factor may be followed at increasing voltage and that the reliability of the insulation may be concluded only from the character of the curve plotted.

The measurement of the loss factor hitherto proposed in connection with an alternating-current bridge presents still, notwithstanding the above-mentioned simplified methods, difficulties in recording a curve which represents the relation between loss factor and voltage, since the deflection of the measuring instrument depends upon the voltage. Consequently, a number of measurements each with gradually increased voltage and with a sensitiveness of the testing device corresponding to the applied voltage must be effected, and the measuring points thus obtained are plotted to form the desired curve.

Such a method is not very suitable for measurements taken during the operation of the object under investigation. Consequently, it has already been proposed to plot the loss current in accordance with the voltage instead of the loss factor, it being assumed that at the moment at which the curve of the loss angle presents a non-uniformity also the loss current curve must present a corresponding discontinuity so that instead of the loss factor the loss current may be readily plotted. The plotting may be carried out with the aid of the above-mentioned alternating current bridge without changing the sensitiveness of the testing instrument.

The present invention relates to an improvement of the above testing method and of the arrangements necessary for this method, and more particularly to the fact that the especially important determination of the relation between the loss factor and the voltage or the loss current and voltage is combined with the prescribed test under an overvoltage for a predetermined period. In this manner it is possible to determine in a single curve two test readings.

My invention is illustrated in the accompanying drawing, in which—

Fig. 1 represents a theoretical graph to be plotted according to the invention.

Fig. 2 shows the general arrangement for producing a graph of the character shown in Fig. 1, and Fig. 3 shows constructive details for directly recording such a graph on a paper strip.

At first it is possible according to recent experiences to determine whether the insulation has not been injured by the prescribed voltage test or whether it is to be feared that the insulation which has at first withstood the high-voltage test will fail in operation for other reasons within a relatively short time. Furthermore, proof is furnished at the same time that the insulation has withstood the prescribed voltage test for the specified time.

The test when based on the loss current may be carried out, for instance, as follows: After inserting the object to be tested in the testing connection the voltage is increased from zero by hand as steadily as possible. In this case, the one responsive element of a suitable coordinate plotting recorder of any conventional design is so connected to the measuring connection that its deflection plots the ordinates corresponding to the magnitude of the loss current. The other responsive element of the recorder is actuated by the testing voltage and plots the abscissae. Consequently, the coordinate plotting recorder records a curve the abscissae of which correspond, for instance, to the voltage and the ordinates to the loss current. After the prescribed testing voltage is attained the latter is maintained at its maximum value for the specified time. In order to record as refered to time the fluctuations of the loss current occuring during this constant voltage period it is preferable to replace the control of the voltage responsive element of the coordinate recorder through the rising voltage value now by a time element after the desired maximum voltage value is attained, and to maintain this element at a steady, continuous motion by a suitable device to be described later, so as to produce in the diagram, Fig. 1, the time line T as abscissae, in other words to now plot time against loss current at constant test voltage. This may, for instance, be obtained by connecting a resistance in series with the voltage responsive element during the voltage rise and upon attainment of the maximum voltage to continuously decrease this resistance with the aid of a time measuring device, i. e., of a clock or synchronous motor in such manner that as soon as the maximum voltage value is obtained the deflection of the former voltage responsive element now increases linearly with the time.

Fig. 1 shows a graph based on the foregoing considerations. The loss current $I_v$ is plotted vertically against the voltage E which is plotted horizontally. The final value of the rising voltage $E_p$ is attained at point P. From this point a time responsive motion is imparted to the voltage responsive element of the recorder as above described, for the time T corresponding to the specified testing time, and the abscissae of the diagram from point P to the right now represent time. The driving gear for the time motion may preferably be employed to disconnect the voltage automatically from the object to be tested after the specified time interval has elapsed. The graph shown in Fig. 1 represents the ideal graph based on an insulation having no weak points whatever and which is stressed within due limits. As shown in the graph the loss current increases linearly with the voltage E and remains constant upon the attainment of the maximum voltage $E_p$ during the test.

When plotting such a curve it will be preferable not to derive from it absolute test values. The main point is that in such a curve the loss current normally varies substantially linearly with the voltage and does not suddenly depart from the linearity and that furthermore the loss current does not normally present any substantial changes during the continuous voltage test.

In some cases it may be preferable to record directly the loss factor instead of the loss current. In this case a relationship between the instrument deflection and the voltage which cannot be avoided in any case must be properly compensated for. This condition may be fulfilled by the connection for measuring the loss current as shown in Fig. 2. I denotes a transformer from which a continuously varying voltage may be tapped off by means of the potentiometer connection II. The bridge connection consists of the standard capacitor 2, the object to be tested 3 and of two ohmic resistances 4 and 5.

Measuring bridges of this type for alternating current are well known in the art. By using a phase responsive measuring instrument in the bridge branch, any desired components of the currents flowing in this branch can be measured, provided the zero method is used, which is possible if the individual arms of the bridge are suitably dimensioned, and provided a synchronously operating switch (such as 7 in Fig. 2) is used in the bridge branch. This switch closes, during one half of each period, a contact and opens it during the other half. The phase is controllable at will, so that for instance the loss current, i. e., the current which is in phase with the voltage supplied to the bridge can be measured. It is assumed, of course, that the comparison condenser (for instance 2 in Fig. 2) is substantially free from losses for all practical purposes. So long as the insulation of the test capacity does not suffer any changes during the test, the loss current must rise linearly with voltage supplied to the bridge. In other words, a graph must result such as is shown in Fig. 1. Under these conditions, therefore, the loss angle, or $tg\delta$ must remain constant. When the loss current is indicated as $tg\delta$ the following must be taken into consideration: Loss current and $tg\delta$, as is well known, have a linear relation to one another. Therefore with linearly increasing voltage, the sensitivity of the indicating instrument of the recorder must be diminished linearly to the same extent. Then the indication of $tg\delta$ will remain constant with linear increase of the loss current. This would explain the necessity and function of the resistance 9 (to be referred to later) in Fig. 2 which varies with the supply voltage.

In the present case, a suitable coordinate recording apparatus of any suitable type may be used, one recording element 6 of which is connected into the bridge branch $a$—$b$ and in series with a rectifier 7. This rectifier is phase controlled by the coil $7^a$ from the variable secondary winding of the transformer I through a high ohmic resistance 8. The other voltage responsive recording element 12 of the recording apparatus is connected to the varying voltage supply in a manner to be referred to later. One of the ohmic resistances 4 or 5 must of course be capable of being balanced (not shown) for adjusting the bridge. The same connection may be employed for determining the loss factor; however, in this case the recording apparatus 6 must have a particular sensitiveness for each primary voltage.

To this end, an arrangement as shown in Fig. 2 is employed. An ohmic resistance 9 of which larger or smaller portions may be short-circuited by means of a slide 10 is connected in series with the recording element 6. In order to effect a continuous measurement the motion of the slide 10 and the motion of the means varying the supply voltage, for instance, of the slide 11 shown in the drawing are mechanically so coupled with each other that the sensitiveness of the recording instrument corresponds to the adjusted bridge supply voltage, a constant primary supply voltage for the transformer I being assumed. This way of proceeeding may be employed if as usual the bridge voltage is regulated not on the secondary side of the transformer but on the primary side; for instance, directly with the aid of the feeding generator, not shown here. Also in this case the slide 10 may be brought into the desired electrical or mechanical relation with the corresponding position of the regulating member. Also any other known means adapted to vary the sensitiveness of a testing instrument are suitable for the case under consideration. The voltage necessary for the voltage responsive element 12 of the coordinate recorder may be tapped off in any manner on the primary or secondary side of the transformer, in the present case it is derived from the secondary of the transformer.

To this end, for instance, the ohmic resistance 8 lying in series with the exciting winding $7a$ of the rectifier 7, as aforedescribed, may be tapped in a very simple manner at 8a as shown in Fig. 2, and coil 12 of the voltage responsive element of the recorder may thus be provided with current, a resistance 13 being in circuit with this coil, which resistance is at first switched in fully while the test voltage rises to its maximum value and is then gradually lessened and finally short-circuited by a synchronous motor 14 while the test voltage remains at maximum value. This motor shown in a diagrammatic form moves the control arm 15a by means of a screw spindle 15 over the resistance 13 during the specified constant high voltage testing time. In this manner, at the time the maximum test voltage is attained by regulating the supply voltage at 11, the motor 14, when thrown into circuit by any suitable means, for instance by hand, takes over the control of the further movement of the voltage responsive element 12, but now controlled in this further movement only by time, in other words the portion T of the curve in Fig. 1 is now plotted. This portion should theoretically remain a straight line, parallel to the abscissa axis if the loss current remains constant at the value which it had attained when the maximum test voltage value P was attained. At the end of the high voltage testing period a contact 16 may effect an automatic disconnection, for instance, of the primary voltage of the transformer 1. This feature is not shown here since it forms no part of the present invention and may be arranged by any skilled electrical engineer.

The arrangement so far described requires a coordinate plotting recorder for recording the desired curves. Such an apparatus is relatively expensive to manufacture and there is a certain reluctance in employing such a recorder, since the curve cannot be so recorded as to attain a directly visible record, but it is necessary to develop a light-sensitive paper or film on which the curve is recorded.

This instrument which is not so suitable for operating purposes may be dispensed with in a relatively simple manner, if a conventional coordinate plotting recorder is arranged so that the loss current, acting on the appertaining current sensitive element of the recorder, moves that element transversely over a record paper strip, the latter being fed longitudinally and linearly with the increase in test voltage, and so that upon the attainment of the maximum test voltage the further longitudinal feeding of the paper is taken care of by a time mechanism, i. e., by a clock or a synchronous motor.

This may be effected according to the arrangement shown in Fig. 3. Here 25 is an induction voltage regulator of any conventional type comprising a stator and a rotor in well-known arrangement and by which is supplied the continuously varying voltage for the bridge connection. It is presupposed in this case that the voltage increases linearly with the angle of torsion of the induction voltage regulator. The rotor shaft 17 may be rotated from outside by any suitable means, as by hand, to the desired extent to gradually increase the test voltage which is delivered at 25a to the bridge 2, 3, 4, 5 of the type described with reference to Fig. 2. From this test voltage source is also tapped off the voltage supply for energizing rectifier 7 located in the bridge circuit, which latter contains also the loss current responsive element 32. This element, which may be of any conventional construction, not involved in the present invention, moves its stylus arm 33 over the record paper of a recording drum 21, and thereby records the loss current $I_v$ in a direction transversely of the paper strip. Now the strip should be moved longitudinally and linearly with the increase in testing voltage in order to record the abscissa values E on the paper in combination with the ordinate values $I_v$. For this purpose a drive connection between the angular adjustment of voltage regulator 25 and drum 21 must be provided.

A device suitable for the electrical transmission of this angle of torsion of the voltage regulator, for instance, a telemeter transmitter 18 designed in the form of a three-phase motor—well known in angular transmitting devices, such as distant-controlled gun levelling or sighting devices, as for instance disclosed in United States Patent No. 1,122,942 to Kaminski—is connected to the rotor shaft 17 of the induction voltage regulator through a gear 18a. This telemeter transmitter 18 is electrically connected to a conventional receiver 19 of similar construction used in this known type of transmitting system, which drives a paper drum 21 of a recording device through a transmission gear 19a and a pawl 20. This pawl is pivotally mounted on gear 19a near its periphery and engages the teeth of a ratchet wheel 20a mounted on the drum shaft when the peripheral portion of gear 19a facing the observer in Fig. 3 moves downwardly, and thereby rotates the drum 21 in the same direction the desired angular distance determined by the angular motion of voltage regulator 25 and sent by transmitter 18, 19. Drum 21 may, however, also be driven in the same direction from its opposite end by means of a similar pawl 24 which engages the teeth of a ratchet wheel 24a mounted on the drum shaft. The pawl itself is pivotally attached to a gear wheel 30, near the latter's periphery, this gear being driven by a gear train 23 from a suitably time-controlled motor 22. Since with this construction both pawls, 20 and 24, feed drum 21 in the same direction, it becomes possible to feed the drum forward by means of transmitter 18, 19 when motor 22 stands still, and likewise to feed the drum forward in the same direction by means of motor 22 when the transmitter 18, 19 is stationary. This is a well-known type of independent double feeding.

The operation of motor 22, which may be a synchronous motor as in Fig. 2, is timely controlled as to its operation by means of a switch 26, connected into the current supply of motor 22 and controlled itself by the angular motion of voltage regulator 25. For this purpose rotor shaft 17 carries an operating arm 31 which can be angularly adjusted on the shaft and which engages switch 26 and closes it after the regulator shaft has moved through the desired angle, determined by the setting of arm 31 for the desired maximum voltage, so that at this moment at which the rotation of the regulator rotor is stopped by arm 31, motor 22 is started and continues rotating drum 21 at the constant voltage supplied by the regulator to the recording device.

In the practical operation of this recorder, at the start with the loss current and the test voltage at zero, the recording arm 33 will be at the zero line on the recording paper which is indicated by a dash-dot line $E_p$ in Fig. 3. As the test voltage $E_p$ rises with the rotation of regulator 25, drum 21 is moved in the direction of the arrow by transmitter 18, 19, and at the same time the rising loss current $I_v$ moves arm 33 to the right, thus tracing the line $I_v$ on the paper ($I_v$ plotted against $E_p$). When point P has been reached on the abscissa line, arm 31 of the regulator, having been set for that point, closes switch 26 and thereby stops further rotation of the regulator and at the same time starts motor 22 which now continues rotation of the drum 21 in the same direction with arm 33 standing still (provided the test object 3 holds out under the applied maximum voltage and thus $I_v$ remains constant) so that now the dash line curve portion is produced in which $I_v$ is plotted against time T at constant voltage. Thus the diagram shown in Fig. 1 is produced on the record paper, as indicated in Fig. 3. Motor 22 may be stopped at any desired time—depending upon the desired maximum voltage test time—by any suitable means, such as a hand switch, not shown in Fig. 3.

I claim as my invention:

1. The method for testing and recording high voltage insulation, consisting in recording the variations of an electric value depending upon the loss factor of the insulation to be tested first during a steady increase of the testing voltage up to the prescribed value of the test voltage for a voltage test to ascertain the character of the loss factor at different test voltages, and then maintaining the prescribed testing voltage value constant, during a time interval prescribed for the time test to obtain a continuous curve for ascertaining the loss factor character during the voltage and time test.

2. In a system for testing high voltage insulation, a voltage source, means for steadily varying said voltage within prescribed limits, a circuit arrangement containing the high voltage insulation to be tested and adapted to produce values depending upon the loss factor of the insulation to be tested at the different voltages, a recording testing instrument included in said circuit arrangement and means for actuating a feed mechanism of said testing instrument first in accordance with the variation of voltage of the voltage source, and then in accordance with the time to obtain a continuous curve for ascertaining the loss factor character during the voltage and time test.

3. In a system for testing high voltage insulation, a voltage source, means for varying said voltage within prescribed limits, a circuit arrangement containing the high voltage insulation to be tested, and adapted to produce a value depending upon the loss factor of the insulation to be tested, a recording testing instrument having two coordinated operating mechanisms and a stationary recording surface for said mechanisms, one of said mechanisms being included in said circuit arrangement and being responsive to said produced value, and means for supplying the other mechanism first with an operating voltage varying in accordance with the testing voltage and then with an auxiliary operating voltage increasing linearly with the time to produce a coordinate test diagram.

4. In a system for testing high voltage insulation, a voltage source, means for varying said voltage within prescribed limits, a circuit arrangement containing the high voltage insulation to be tested and adapted to produce a value depending upon the loss factor of the insulation to be tested, a recording testing instrument having two coordinated operating mechanisms and a stationary recording surface for said mechanisms, one of said mechanisms being included in said circuit arrangement and being responsive to said produced value, a control resistance for controlling the operation of the other mechanism, circuit connections for controlling the operation of said other mechanism first in accordance with the voltage which varies with the test voltage, and means for controlling said other mechanism by said control resistance after the test voltage has attained its maximum value.

5. In a system for testing high voltage insulation, a voltage source, means for varying said voltage within prescribed limits, an alternating current measuring bridge with deflection measurement and containing the object to be tested, a recording testing instrument having two coordinate operating mechanisms and a stationary recording surface for said mechanisms, one of said operating mechanisms being located in the diagonal of said measuring bridge, means comprising a series and shunt resistance for varying the sensitiveness of said one operating mechanism, and means for varying the test voltage simultaneously with the sensitiveness of said operating member, and means for supplying the other operating mechanism first with an operating voltage varying in accordance with the test voltage and then with an auxiliary operating voltage increasing linearly with time.

6. In a system for testing high voltage insulation, a voltage source, means for steadily varying said voltage within prescribed limits, a circuit arrangement containing the high voltage insulation to be tested and adapted to produce a value depending upon the loss factor of the insulation to be tested, a coordinate recorder having a recording surface and a recording testing instrument included in said circuit arrangement and adapted to record its response upon said recording surface, means for moving the recording surface of said recorder first in accordance with the variation of the test voltage, and means for automatically varying said surface movement, to move in accordance with time upon the attainment of the test voltage maximum, and for automatically disconnecting the test voltage after the prescribed testing time has elapsed to obtain a continuous curve indicating the loss factor character during the varying voltage and time test.

7. In a system for testing high voltage insulation, a test voltage source, means for steadily increasing said voltage within prescribed limits, a circuit arrangement containing the high voltage insulation to be tested and adapted to produce values depending upon the loss factor of the insulation to be tested, a coordinate recorder having a movable recording surface and a recording mechanism connected to said circuit arrangement and responsive to said produced values to record said values on said surface, means for moving said surface transversely to the recording motions of said mechanism first linearly in accordance with the increase of said test voltage to the desired maximum value of said voltage to produce a graph on said surface recording different produced values in accordance with the test voltage variations, means for arresting the operating means of said surface in accordance with the test voltage after the desired maximum voltage value is attained, and outside means, controlled by the arresting of said first-mentioned surface operating means, for continuing the operation of said surface for a prescribed time period, with the maximum test voltage effective upon said recording mechanism, to produce a continuous graph on said surface recording the loss factor character during the varying voltage test and at maximum test voltage in accordance with time.

GEORG KEINATH.